United States Patent
Ishibashi et al.

(10) Patent No.: US 10,822,771 B2
(45) Date of Patent: Nov. 3, 2020

(54) SYSTEM FOR CONTROLLING WORK VEHICLE, METHOD FOR CONTROLLING WORK VEHICLE, AND WORK VEHICLE

(71) Applicant: KOMATSU LTD., Tokyo (JP)

(72) Inventors: Eiji Ishibashi, Tokyo (JP); Kazuhiro Hashimoto, Tokyo (JP); Akifumi Inamaru, Tokyo (JP); Yosuke Kogawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 144 days.

(21) Appl. No.: 16/083,054

(22) PCT Filed: Jul. 26, 2017

(86) PCT No.: PCT/JP2017/027131
§ 371 (c)(1),
(2) Date: Sep. 7, 2018

(87) PCT Pub. No.: WO2018/025733
PCT Pub. Date: Feb. 8, 2018

(65) Prior Publication Data
US 2019/0078298 A1 Mar. 14, 2019

(30) Foreign Application Priority Data
Aug. 5, 2016 (JP) .................. 2016-154815

(51) Int. Cl.
*E02F 9/20* (2006.01)
*G05D 1/02* (2020.01)
*E02F 9/26* (2006.01)

(52) U.S. Cl.
CPC .............. *E02F 9/2045* (2013.01); *E02F 9/20* (2013.01); *E02F 9/205* (2013.01); *G05D 1/0274* (2013.01);
(Continued)

(58) Field of Classification Search
CPC . E02F 9/2045; E02F 9/20; E02F 9/205; E02F 9/262; E02F 3/841; E02F 3/76; E02F 3/845; G05D 2201/0202; G05D 1/0278
See application file for complete search history.

(56) References Cited

U.S. PATENT DOCUMENTS 5,875,854 A    3/1999    Yamamoto et al.
5,924,493 A    7/1999    Hartman et al.
(Continued)

FOREIGN PATENT DOCUMENTS

JP    6-167326 A    6/1994
JP    8-506870 A    7/1996
(Continued)

OTHER PUBLICATIONS

US 5,526,002 A, 06/1996, Gudat et al. (withdrawn)
(Continued)

*Primary Examiner* — Anne Marie Antonucci
(74) *Attorney, Agent, or Firm* — Global IP Counselors, LLP

(57) ABSTRACT

A sensor outputs a signal indicating an excavation start position at which a work implement starts excavation. A controller determines an inclination angle of a virtual design surface so that an amount of soil between the virtual design surface extending from the excavation start position and a current landscape matches a predetermined target amount of soil. The controller generates a command signal that causes the work implement to move along the virtual design surface extending from the excavation start position in a direction inclined at the inclination angle.

13 Claims, 18 Drawing Sheets

(52) U.S. Cl.
CPC ............ *E02F 9/262* (2013.01); *G05D 1/0278* (2013.01); *G05D 2201/0202* (2013.01)

(56) References Cited

U.S. PATENT DOCUMENTS

| | | | |
|---|---|---|---|
| 2008/0082238 A1* | 4/2008 | Mannepalli | E02F 3/842 |
| | | | 701/50 |
| 2013/0081831 A1 | 4/2013 | Hayashi | |
| 2013/0311031 A1 | 11/2013 | Friend et al. | |
| 2014/0012404 A1 | 1/2014 | Taylor et al. | |
| 2014/0180548 A1* | 6/2014 | Edara | E02F 9/205 |
| | | | 701/50 |
| 2016/0069042 A1 | 3/2016 | Wei et al. | |
| 2016/0076223 A1 | 3/2016 | Wei et al. | |

FOREIGN PATENT DOCUMENTS

| | | |
|---|---|---|
| JP | 10-317418 A | 12/1998 |
| JP | 2000-230253 A | 8/2000 |
| JP | 2003-64725 A | 3/2003 |
| JP | 2003-239287 A | 8/2003 |
| JP | 5247939 A | 7/2013 |
| JP | 2016-132912 A | 7/2016 |

OTHER PUBLICATIONS

The International Search Report for the corresponding international application No. PCT/JP2017/027131, dated Sep. 12, 2017.
The Office Action for the corresponding Japanese application No. 2016-154815, dated Aug. 4, 2020.

\* cited by examiner

SYSTEM FOR CONTROLLING WORK VEHICLE, METHOD FOR CONTROLLING WORK VEHICLE, AND WORK VEHICLE

CROSS-REFERENCE TO RELATED APPLICATIONS

This application is a U.S. National stage application of International Application No. PCT/JP2017/027131, filed on Jul. 26, 2017. This U.S. National stage application claims priority under 35 U.S.C. § 119(a) to Japanese Patent Application No. 2016-154815, filed in Japan on Aug. 5, 2016, the entire contents of which are hereby incorporated herein by reference.

BACKGROUND

The present invention relates to a system for controlling a work vehicle, a method for controlling a work vehicle, and a work vehicle.

Traditionally, for a work vehicle such as a bulldozer or a grader, controlling of automatically adjusting the position of a work implement has been proposed. For example, Japanese Patent No. 5247939 discloses an excavation control and a ground leveling control.

In the excavation control, the position of a blade is automatically adjusted so that a load applied to the blade matches a target load. In the ground leveling control, the position of the blade is automatically adjusted so that an edge of the blade moves along a design landscape indicating the shape of a target to be subjected to excavation.

SUMMARY

According to the aforementioned control, the occurrence of a shoe slip can be reduced by lifting a work implement upon an excessive increase in a load applied to the work implement. This makes it possible to efficiently perform a work operation.

In the conventional control, however, as shown in FIG. 18, when a load applied to a work implement 100 increases after the start of excavation of a current landscape 300, the work implement 100 is lifted by load controlling (refer to a trajectory 200 of the work implement 100). Then, when the load applied to the work implement 100 increases after the restart of the excavation, the work implement 100 is lifted again. When this operation is repeated, a landscape with a large irregularity is formed and it is difficult to perform a smooth excavation operation. In addition, there is a concern that the excavated landscape easily gets rough and the quality of a finish may be degraded.

An object of the invention is to provide a system for controlling a work vehicle, a method for controlling a work vehicle, and a work vehicle, which enable an excavation operation to be efficiently performed with a high-quality finish.

A control system according to a first aspect is a system that controls a work vehicle including a work implement and includes a storage device, a sensor, and a controller. The storage device stores current landscape information indicating a current landscape to be subjected to a work operation. The sensor outputs a signal indicating an excavation start position at which the work implement starts excavation. The controller communicates with the storage device and receives the signal from the sensor.

The controller determines an inclination angle of a virtual design surface so that the amount of soil between the virtual design surface extending from the excavation start position and the current landscape matches a predetermined target amount of soil. The controller generates a command signal that causes the work implement to move along the virtual design surface extending from the excavation start position in a direction inclined at the inclination angle.

A computer-implemented method for controlling a work vehicle including a work implement according to a second aspect includes the following steps. The first step is to acquire current landscape information indicating a current landscape to be subjected to a work operation. The second step is to acquire an excavation start position at which the work implement starts excavation. The third step is to determine an inclination angle of a virtual design surface so that the amount of soil between the virtual design surface extending from the excavation start position and the current landscape matches a predetermined target amount of soil. The fourth step is to generate a command signal that causes the work implement to move along the virtual design surface extending from the excavation start position in a direction inclined at the inclination angle.

A work vehicle according to a third aspect includes a work implement, a sensor, and a controller. The sensor outputs a signal indicating an excavation start position at which the work implement starts excavation. The controller receives the signal from the sensor. The controller determines an inclination angle of a virtual design surface so that the amount of soil between the virtual design surface extending from the excavation start position and a current landscape to be subjected to a work operation matches a predetermined target amount of soil. The controller generates a command signal that causes the work implement to move along the virtual design surface extending from the excavation start position in a direction inclined at the inclination angle.

According to the invention, excavation is performed along a virtual design surface that is inclined and extends from an excavation start position. Then, a landscape to be subjected to a work operation can be shaped into a target shape by repeating the excavation along the virtual design surface. Thus, the excavation can be smoothly performed without forming a large irregularity. In addition, an inclination angle of the virtual design surface is determined based on the amount of soil to be excavated by a work implement. Thus, a rapid increase in a load applied to the work implement due to an excessively large amount of excavated soil is reduced. Furthermore, a decrease in the efficiency of the work operation due to an excessively small amount of excavated soil is reduced. Thus, the excavation operation can be efficiently performed with a high-quality finish.

DETAILED DESCRIPTION OF THE PREFERRED EMBODIMENT

Figure 1:
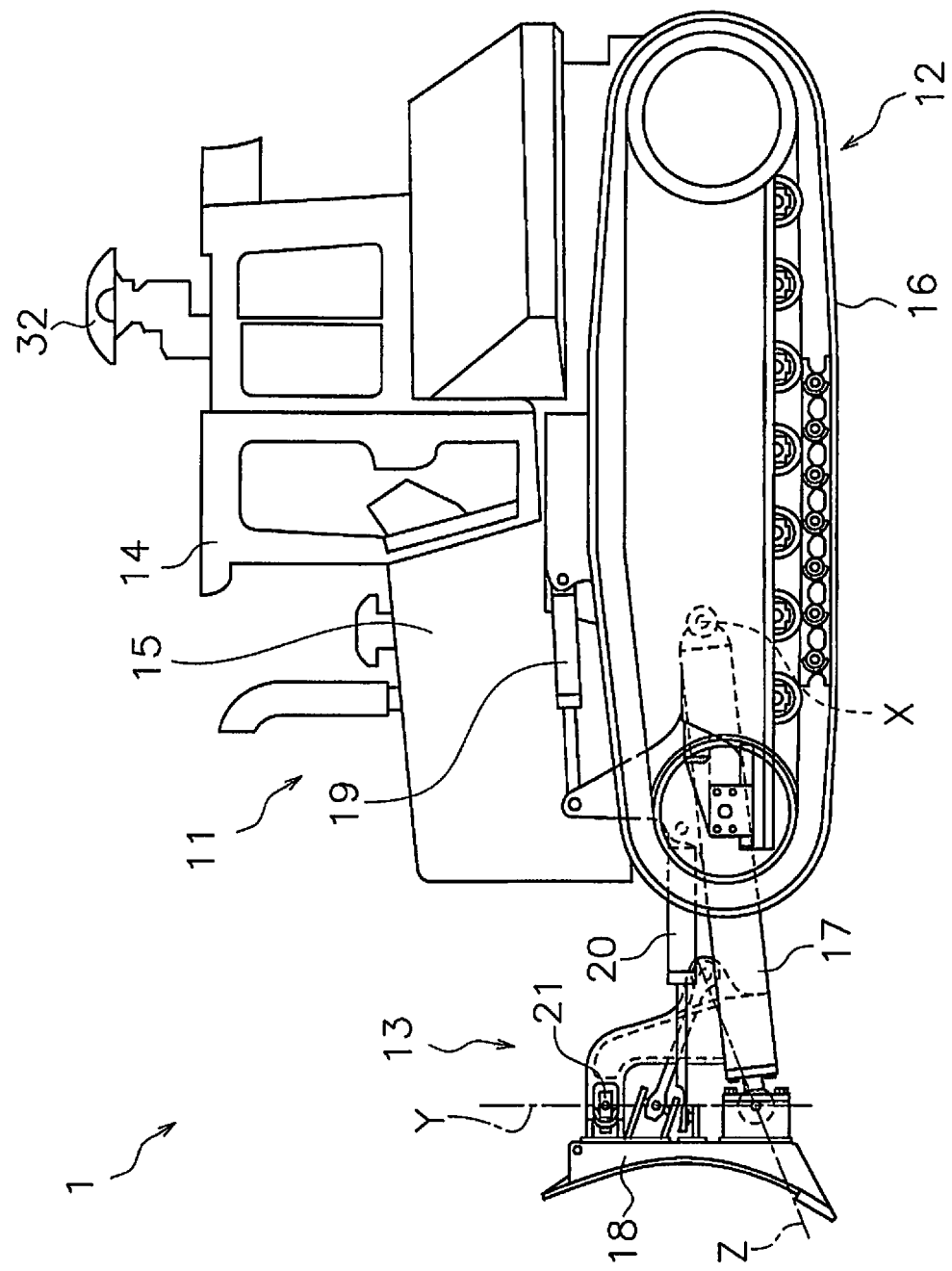
FIG. 1 is a side view showing a work vehicle according to an embodiment.

Hereinafter, a work vehicle according to an embodiment is described with reference to the accompanying drawings. FIG. 1 is a side view showing the work vehicle 1 according to the embodiment. The work vehicle 1 according to the embodiment is a bulldozer. The work vehicle 1 includes a vehicle body 11, a traveling device 12, and a work implement 13.

The vehicle body 11 includes an operator cab 14 and an engine compartment 15. In the operator cab 14, an operator seat, which is not shown, is disposed. The engine compartment 15 is disposed in front of the operator cab 14. The traveling device 12 is attached to a lower portion of the vehicle body 11. The traveling device 12 includes a pair of left and right crawlers 16. Note that FIG. 1 shows only the left crawler 16. The rotation of the crawlers 16 allows the work vehicle 1 to travel.

The work implement 13 is attached to the vehicle body 11. The work implement 13 includes a lift frame 17, a blade 18, a lift cylinder 19, an angle cylinder 20, and a tilt cylinder 21.

The lift frame 17 is attached to the vehicle body 11 and capable of pivoting up and down about an axial line X extending in a vehicle width direction. The lift frame 17 holds the blade 18. The blade 18 is disposed in front of the vehicle body 11. The blade 18 moves up and down together with upward and downward movements of the lift frame 17.

The lift cylinder 19 is coupled to the vehicle body 11 and the lift frame 17. The lift frame 17 pivots up and down about the axial line X in accordance with the expansion and contraction of the lift cylinder 19.

The angle cylinder 20 is coupled to the lift frame 17 and the blade 18. The blade 18 pivots about an axial line Y extending in a substantially up-down direction in accordance with the expansion and contraction of the angle cylinder 20.

The tilt cylinder 21 is coupled to the lift frame 17 and the blade 18. The blade 18 pivots about an axial line Z extending in a substantially vehicle front-back direction in accordance with the expansion and contraction of the tilt cylinder 21.

Figure 2:
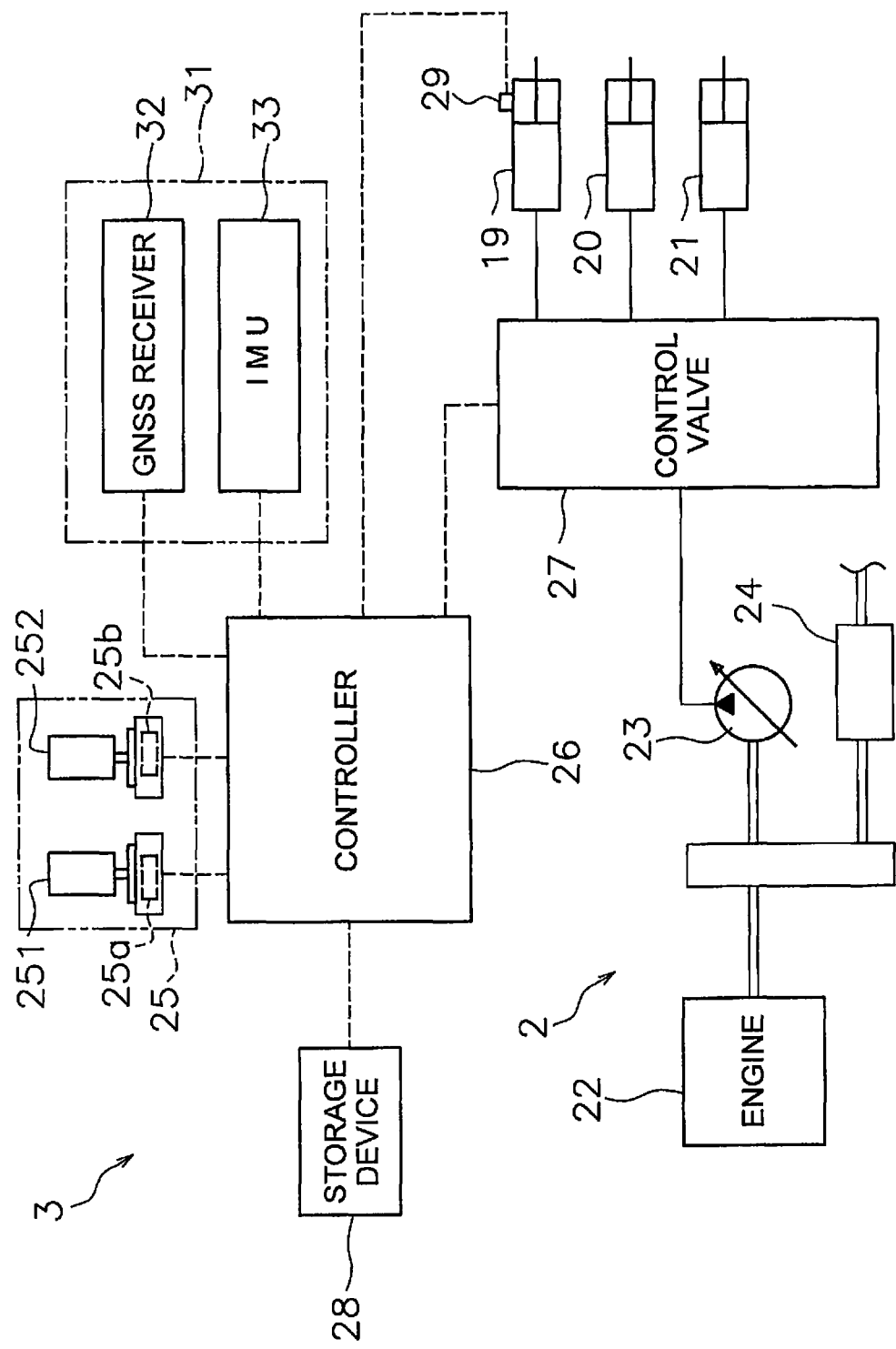
FIG. 2 is a block diagram showing a configuration of a driving system and control system of the work vehicle.

FIG. 2 is a block diagram showing a configuration of a driving system 2 and control system 3 of the work vehicle 1. As shown in FIG. 2, the driving system 2 includes an engine 22, a hydraulic pump 23, and a power transmission device 24.

The hydraulic pump 23 is driven by the engine 22 and discharges a hydraulic fluid. The hydraulic fluid discharged from the hydraulic pump 23 is supplied to the lift cylinder 19, the angle cylinder 20, and the tilt cylinder 21. Note that although FIG. 2 shows the single hydraulic pump 23, multiple hydraulic pumps 23 may be disposed.

The power transmission device 24 transmits driving force of the engine 22 to the traveling device 12. The power transmission device 24 may be a hydro static transmission (HST), for example. Alternatively, the power transmission device 24 may be a torque converter or a transmission having multiple transmission gears, for example.

The control system 3 includes an operating device 25, a controller 26, and a control valve 27. The operating device 25 is a device for operating the work implement 13 and the traveling device 12. The operating device 25 is disposed in the operator cab 14. The operating device 25 includes an operation lever, a pedal, a switch, and the like, for example.

The operating device 25 includes an operating device 251 for the traveling device 12 and an operating device 252 for the work implement 13. The operating device 251 for the traveling device 12 is disposed so that the operating device 251 can be operated in a forward position, a reverse position, and a neutral position. When an operational position of the operating device 251 for the traveling device 12 is the forward position, the traveling device 12 or the power transmission device 24 is controlled so that the work vehicle 1 moves forward. When the operational position of the operating device 251 for the traveling device 12 is the reverse position, the traveling device 12 or the power transmission device 24 is controlled so that the work vehicle 1 moves backward.

The operating device 252 for the work implement 13 is mounted in a manner capable of operating the lift cylinder 19, the angle cylinder 20, and the tilt cylinder 21. By operating the operating device 252 for the work implement 13, a lift operation, angle operation, and tilt operation of the blade 18 can be performed.

The operating device 25 includes sensors 25a and 25b that detect an operation of the operating device 25 performed by an operator. The operating device 25 receives an operation performed by the operator to drive the work implement 13 and the traveling device 12, and the sensors 25a and 25b output operation signals based on the operation. The sensor 25a outputs an operation signal based on an operation of the operating device 251 for the traveling device 12. The sensor 25b outputs an operation signal based on an operation of the operating device 252 for the work implement 13.

The controller 26 is programmed to control the work vehicle 1 based on acquired information. The controller 26 includes a processor such as a CPU, for example. The controller 26 acquires the operation signals from the sensors 25a and 25b of the operating device 25. The controller 26 controls the control valve 27 based on the operation signals. The controller 26 is not limited to a single unit and may be separated in multiple controllers.

The control valve 27 is a proportional control valve and is controlled by a command signal from the controller 26. The control valve 27 is disposed between the hydraulic pump 23 and hydraulic actuators for the lift cylinder 19, the angle cylinder 20, and the tilt cylinder 21. The control valve 27 controls a flow rate of the hydraulic fluid supplied from the hydraulic pump 23 toward the lift cylinder 19, the angle cylinder 20, and the tilt cylinder 21. The controller 26 generates the command signal to the control valve 27 so that the work implement 13 operates based on operations of the aforementioned operating device 252. Thus, the lift cylinder 19, the angle cylinder 20, and the tilt cylinder 21 are controlled based on the amounts of the operations of the operating device 252. The control valve 27 may be a pressure proportional control valve. Alternatively, the control valve 27 may be an electromagnetic proportional control valve.

Figure 3:
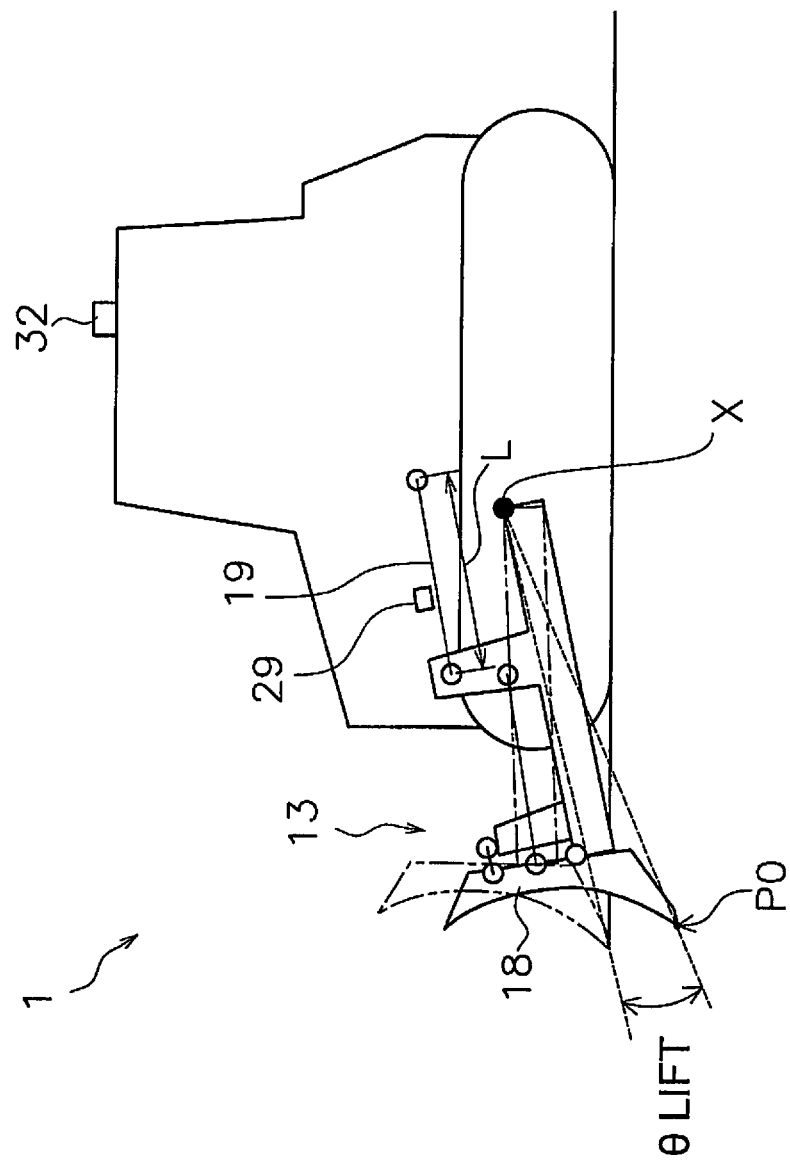
FIG. 3 is a schematic diagram showing a configuration of the work vehicle.

The control system 3 includes a lift cylinder sensor 29. The lift cylinder sensor 29 detects a stroke length (hereinafter referred to as "lift cylinder length L") of the lift cylinder 19. As shown in FIG. 3, the controller 26 calculates a lift angle θlift of the blade 18 based on the lift cylinder length L. FIG. 3 is a schematic diagram showing a configuration of the work vehicle 1.

In FIG. 3, the original position of the work implement 13 is indicated by an alternate long and two short dashes line. The original position of the work implement 13 is the position of the blade 18 in a state in which an edge of the blade 18 is in contact with a horizontal ground surface. The lift angle θlift is an angle with respect to the original position of the work implement 13.

As shown in FIG. 2, the control system 3 includes a position detecting device 31. The position detecting device 31 detects the position of the work vehicle 1. The position detecting device 31 includes a GNSS receiver 32 and an IMU 33. The GNSS receiver 32 is disposed on the operator cab 14. The GNSS receiver 32 is, for example, an antenna for the Global Positioning System (GPS). The GNSS receiver 32 receives vehicle position information indicating the position of the work vehicle 1. The controller 26 acquires the vehicle position information from the GNSS receiver 32.

The IMU 33 is an inertial measurement unit. The IMU 33 acquires vehicle inclination angle information. The vehicle inclination angle information indicates an angle (pitch angle) with respect to a horizontal direction in a vehicle front-back direction and an angle (roll angle) with respect to the horizontal direction in the vehicle width direction. The IMU 33 transmits the vehicle inclination angle information to the controller 26. The controller 26 acquires the vehicle inclination angle information from the IMU 33.

The controller 26 calculates an edge position P0 based on the lift cylinder length L, the vehicle position information, and the vehicle inclination angle information. As shown in FIG. 3, the controller 26 calculates global coordinates of the GNSS receiver 32 based on the vehicle position information. The controller 26 calculates the lift angle θlift based on the lift cylinder length L. The controller 26 calculates local coordinates of the edge position P0 with respect to the GNSS receiver 32 based on the lift angle θlift and vehicle dimension information. The vehicle dimension information is stored in the storage device 28 and indicates the position of the work implement 13 with respect to the GNSS receiver 32. The controller 26 calculates global coordinates of the edge position P0 based on the global coordinates of the GNSS receiver 32, the local coordinates of the edge position P0, and the vehicle inclination angle information. The controller 26 acquires the global coordinates of the edge position P0 as edge position information.

The control system 3 includes the storage device 28. The storage device 28 for example includes a memory and an auxiliary storage device. The storage device 28 may be a RAM, a ROM, or the like, for example. The storage device 28 may be a semiconductor storage device, a hard disk, or the like, for example. The controller 26 communicates with the storage device 28 via a cable or wirelessly to acquire information stored in the storage device 28.

The storage device 28 stores the edge position information, current landscape information, and design landscape information. The design landscape information indicates the position and shape of a final design landscape. The final design landscape is a target landscape to be subjected to a work operation at a work site. The controller 26 acquires the current landscape information. The current landscape information indicates the position and shape of a current landscape to be subjected to the work operation at the work site. The controller 26 automatically controls the work implement 13 based on the current landscape information, the design landscape information, and the edge position information.

Note that the automatic control of the work implement 13 may be semi-automatic control to be performed together with a manual operation by an operator. Alternatively, the automatic control of the work implement 13 may be complete automatic control to be performed without a manual operation by an operator.

Figure 4:
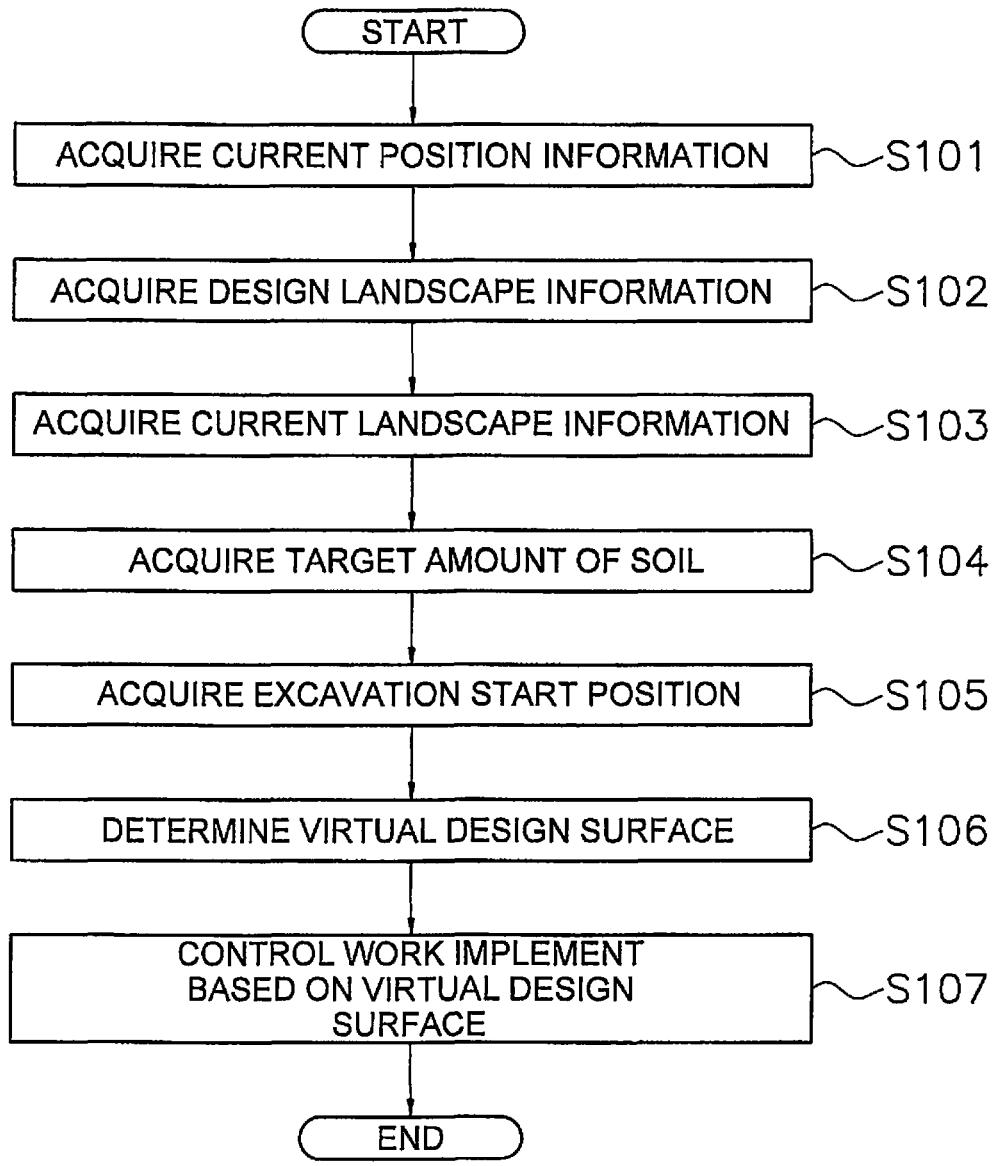
FIG. 4 is a flowchart showing a process of automatic control of the work implement in an excavation operation.

An automatic control, to be performed by the controller 26, of the work implement 13 in an excavation operation is described below. FIG. 4 is a flowchart showing a process of the automatic control of the work implement 13 in the excavation operation.

As shown in FIG. 4, in step S101, the controller 26 acquires current position information. In this case, the controller 26 acquires the current edge position P0 of the work implement 13, as described above.

Figure 5:
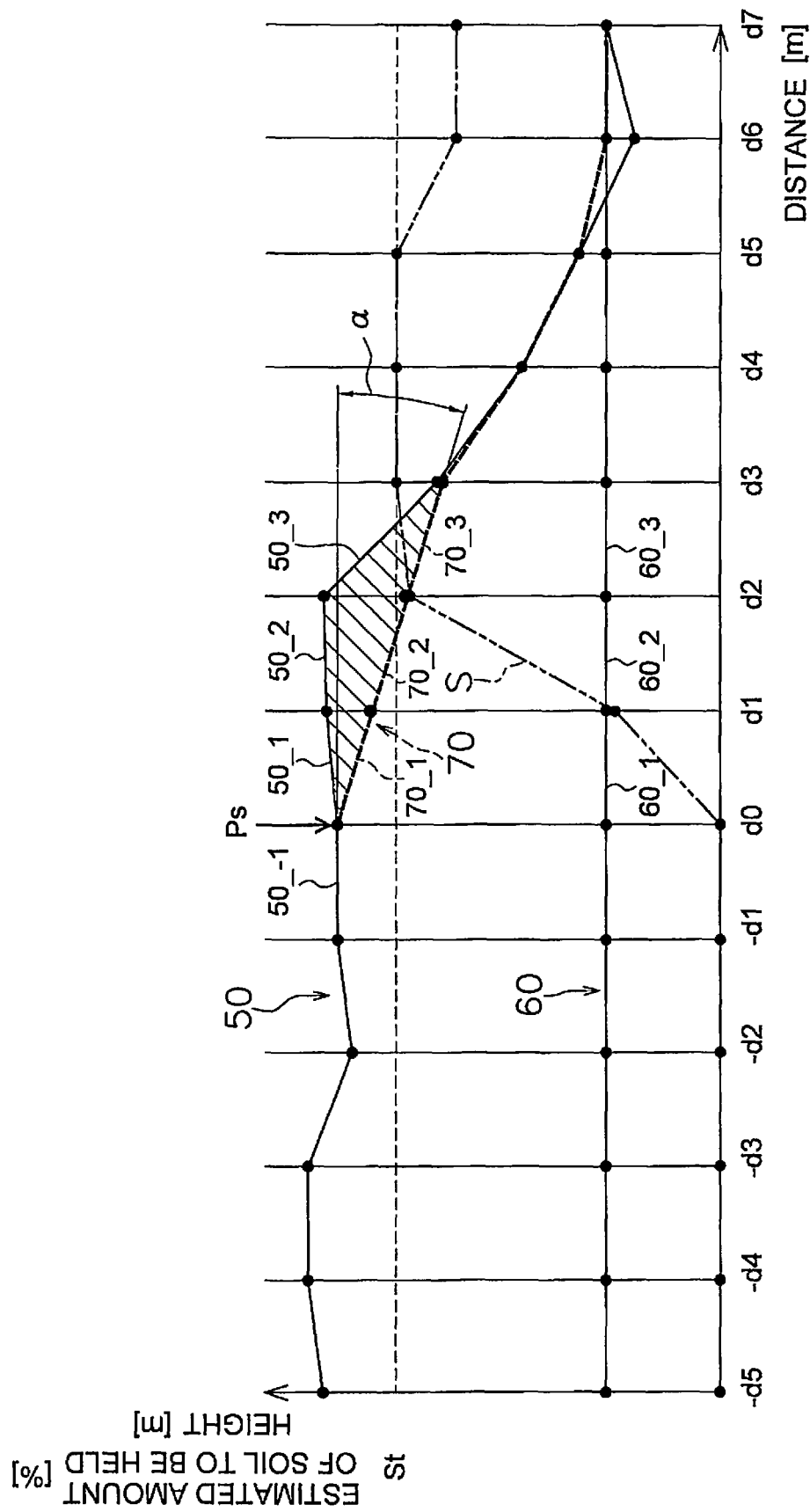
FIG. 5 is a diagram showing an example with a final design landscape, a current landscape, and a virtual design surface.

In step S102, the controller 26 acquires the design landscape information. As shown in FIG. 5, the design landscape information includes heights of multiple points (refer to "−d5" to "d7" shown in FIG. 5) located on a final design landscape 60 and arranged at predetermined intervals in a traveling direction of the work vehicle 1. Thus, the final design landscape 60 is recognized as multiple final design surfaces 60_1, 60_2, and 60_3 obtained by dividing the final design landscape 60 at the multiple points.

Note that, in the drawing, only some of the final design surfaces are indicated by the reference symbols, while reference symbols of the other final design surfaces are omitted. In FIG. 5, the final design landscape 60 is formed in a flat shape parallel to the horizontal direction but may be formed in a different shape.

In step S103, the controller 26 acquires the current landscape information. As shown in FIG. 5, the current landscape information indicates a cross-sectional surface of a current landscape 50 in the traveling direction of the work vehicle 1.

Note that, in FIG. 5, the ordinate indicates the height of the landscape and an estimated amount, described later, of soil to be held, and the abscissa indicates a distance from a reference position d0 in the traveling direction of the work vehicle 1. The reference position may be the current edge position P0 of the work vehicle 1. Specifically, the current landscape information includes the heights of the multiple points of the current landscape 50 in the traveling direction of the work vehicle 1. The multiple points are arranged at the predetermined intervals of, for example, 1 meter (refer to "−5d" to "7d" shown in FIG. 5).

Thus, the current landscape 50 is recognized as multiple current surfaces 50_1, 50_2, and 50_3 obtained by dividing the current landscape 50 at the multiple points. Note that, in the drawing, only some of the current surfaces are indicated by the reference symbols, while reference symbols of the other current surfaces are omitted.

The controller 26 acquires, as the current landscape information, positional information indicating the latest trajectory of the edge position P0. Thus, the position detecting device 31 functions as a current landscape acquiring device that acquires the current landscape information. In response to a movement of the edge position P0, the controller 26 updates the current landscape information to the latest current landscape and causes the latest current landscape to be stored in the storage device 28.

Alternatively, the controller 26 may calculate the positions of bottom surfaces of the crawlers 16 from the vehicle position information and the vehicle dimension information and acquire, as the current landscape information, position information indicating trajectories of the bottom surfaces of the crawlers 16. Alternatively, the current landscape information may be generated from data measured by an external measuring device of the work vehicle 1. Alternatively, the current landscape information may be generated from image data obtained by causing a camera to capture images of the current landscape 50.

In step S104, the controller 26 acquires a target amount of soil St. The target amount of soil St may be a fixed value determined based on the capacity of the blade 18, for example. Alternatively, the target amount of soil St may be arbitrarily set by an operation of the operator.

In step S105, the controller 26 acquires an excavation start position Ps. In this case, the controller 26 acquires the excavation start position Ps based on an operation signal from the operating device 25. For example, the controller 26 may determine, as the excavation start position Ps, the edge position P0 when the controller 26 receives, from the operating device 252, a signal indicating an operation of lowering the blade 18. Alternatively, the excavation start position Ps may be stored in the storage device 28 in advance so that the excavation start position Ps can be acquired from the storage device 28.

In step S106, a virtual design surface 70 is determined. The controller 26 determines the virtual design surface 70 as shown in FIG. 5, for example. The virtual design surface 70 is recognized as multiple design surfaces (divided unit surfaces) 70_1, 70_2, and 70_3 obtained by dividing the virtual design surface 70 at multiple points, similarly to the current landscape 50. Note that in the drawing, only some of the current surfaces are indicated by the reference symbols, while reference symbols of the other current surfaces are omitted. A method for determining the virtual design surface 70 is described later in detail.

In step S107, the work implement 13 is controlled based on the virtual design surface 70. In this case, the controller 26 generates a command signal to the work implement 13 so that the edge position P0 of the work implement 13 moves along the virtual design surface 70 generated in step S106. The generated command signal is input to the control valve 27. Accordingly, an operation of excavating the current landscape 50 is performed in response to the movement of the edge position P0 of the work implement 13 along the virtual design surface 70.

Figure 6:
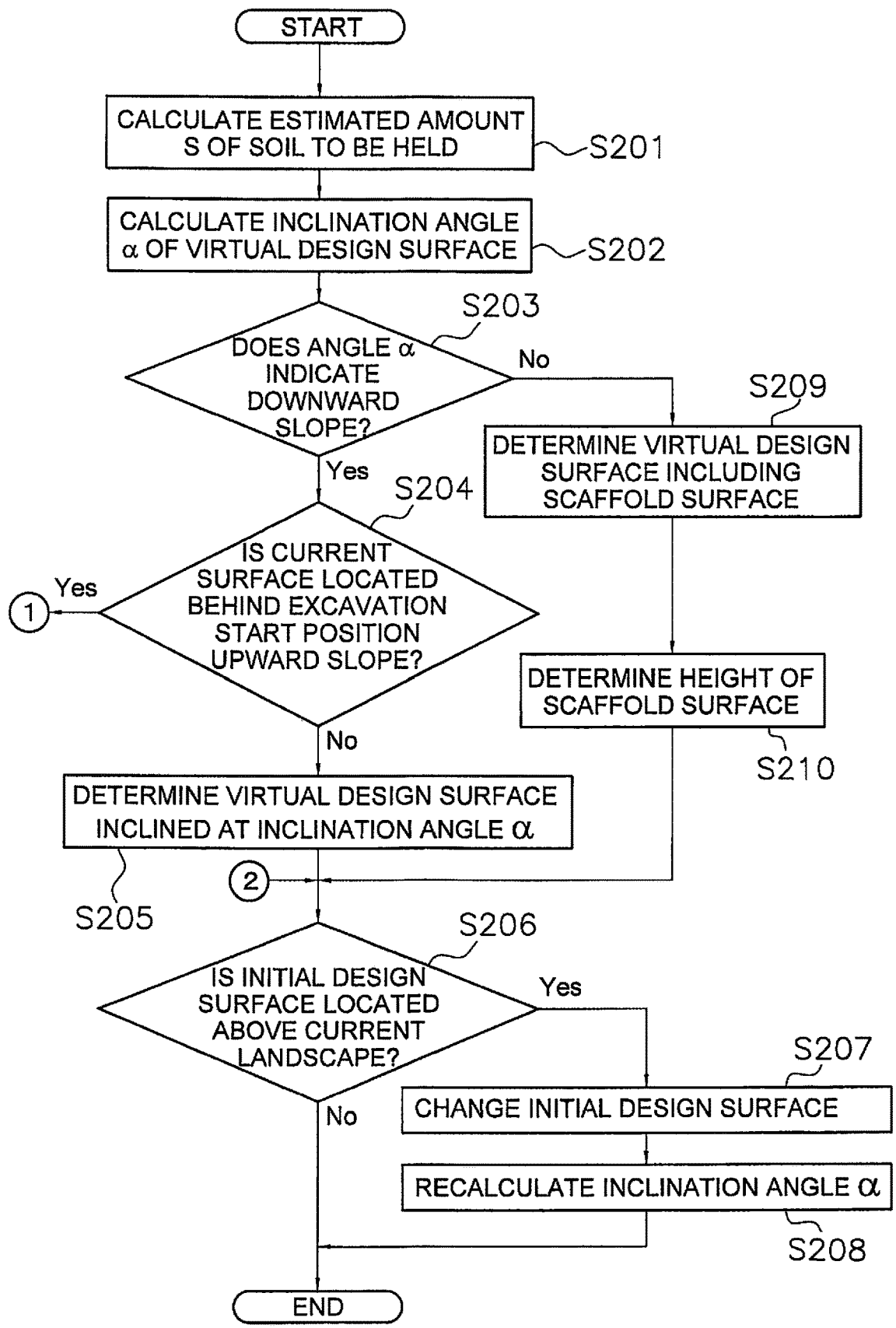
FIG. 6 is a flowchart showing a process of automatic control of the work implement.

Next, a method for determining the virtual design surface 70 is described. FIG. 6 is a flowchart showing a process, to be performed by the controller 26, of determining the virtual design surface 70.

As shown in FIG. 6, in step S201, an estimated amount of soil S to be held by the work implement 13 is calculated. As shown in FIG. 5, the estimated amount of soil S to be held is an estimated value of the amount of soil that is held by the work implement 13 when the edge position P0 of the work implement 13 moves along the virtual design surface 70. The controller 26 calculates an amount of soil between the virtual design surface 70 and the current landscape 50 as the estimated amount of soil S to be held. The alternate long and two short dashes line shown in FIG. 5 indicates changes in the estimated amount of soil S to be held.

The virtual design surface 70 is located above the final design landscape 60, while at least a portion of the virtual design surface 70 is located below the current landscape 50. The virtual design surface 70 linearly extends from the excavation start position Ps.

The amount of soil between the virtual design surface 70 and the current landscape 50 is calculated as an amount corresponding to a cross-sectional area (or the area of a portion hatched in FIG. 5) between the virtual design surface 70 and the current landscape 50, as shown in FIG. 5. Here in the present embodiment, the size of the current landscape 50 in the width direction of the work vehicle 1 is not taken in consideration. The amount of soil, however, may be calculated with the size of the current landscape 50 in the width direction of the work vehicle 1 taken in consideration.

Figure 7:
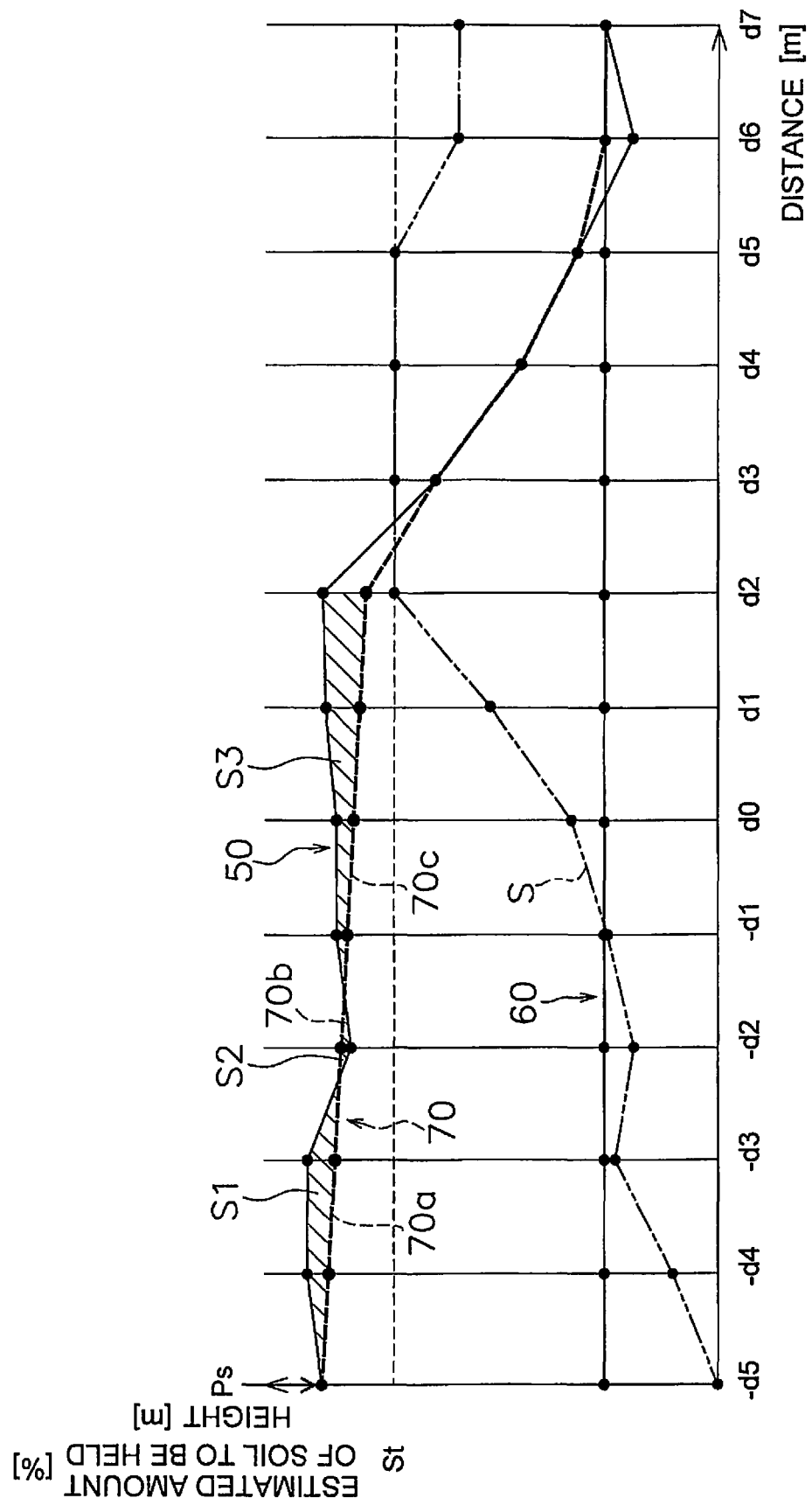
FIG. 7 is a diagram showing an example with a final design landscape, a current landscape, and a virtual design surface.

Note that as shown in FIG. 7, when the current landscape 50 includes a recess, the virtual design surface 70 may include portions (hereinafter referred to as "portions to be excavated") 70a and 70c located below the current landscape 50 and a portion (hereinafter referred to as "portion to be raised") 70b located above the current landscape 50. In this case, the controller 26 calculates, as the estimated amount of soil S to be held, the sum of amounts of soil between the virtual design surface 70 and the current landscape 50 by adding the amount of soil between the portions 70a and 70c to be excavated and the current landscape 50 and subtracting the amount of soil between the portion 70b to be raised and the current landscape 50.

For example, in FIG. 7, an amount S1 of soil between the portion 70a to be excavated and the current landscape 50 and an amount S3 of soil between the portion 70c to be excavated and the current landscape 50 are added to the estimated amount of soil S to be held, and an amount S2 of soil between the portion 70b to be raised and the current landscape 50 is subtracted from the estimated amount of soil S to be held. Thus, the controller 26 calculates the estimated amount of soil S to be held, by S=S1+(−S2)+S3.

In step S202, an inclination angle α of the virtual design surface 70 is calculated. In this case, the controller 26 determines the inclination angle α so that the estimated amount of soil S, calculated in step S201, of soil to be held matches the target amount of soil St acquired in step S104.

For example, as shown in FIG. 5, when a point indicated by a distance d0 (hereinafter referred to as "point d0") is at the excavation start position Ps, the controller 26 calculates the inclination angle α that provides the sum (indicated by a portion hatched in FIG. 5) of amounts of soil between the virtual design surface 70 extending from the excavation start position Ps and the current landscape 50 matches the target amount of soil St. As a result, the virtual design surface 70 linearly extending from the excavation start position Ps to a point d3 at which the target amount of soil St is achieved is determined. Regarding points following the point d3 at which the target amount of soil St is achieved, the virtual design surface 70 is determined so that the virtual design surface 70 extends along the current landscape 50.

Note that, in order to easily calculate the amount of soil, in the embodiment, the amount of soil between a point at which the target amount of soil St is achieved and a point at which the virtual design surface 70 is determined to extend along the current landscape 50 is not taking into consideration for the calculation of the estimated amount of soil S to be held. For example, in FIG. 7, at a point d2, the estimated amount of soil S to be held matches the target amount of soil St. The controller 26 determines the height of the virtual design surface 70 at the point d3 next to the point d2 so that the height of the virtual design surface 70 matches the height of the current landscape 50 at the point d3 next to the point d2. Thus, the amount of soil between the point d2 at which the target amount of soil St is achieved and the point d3 at which the virtual design surface 70 is determined to extend along the current landscape 50 is not included in the estimated amount of soil S to be held. The estimated amount of soil S to be held, however, may be calculated with the amount of soil in this portion taken into consideration.

Figure 8:
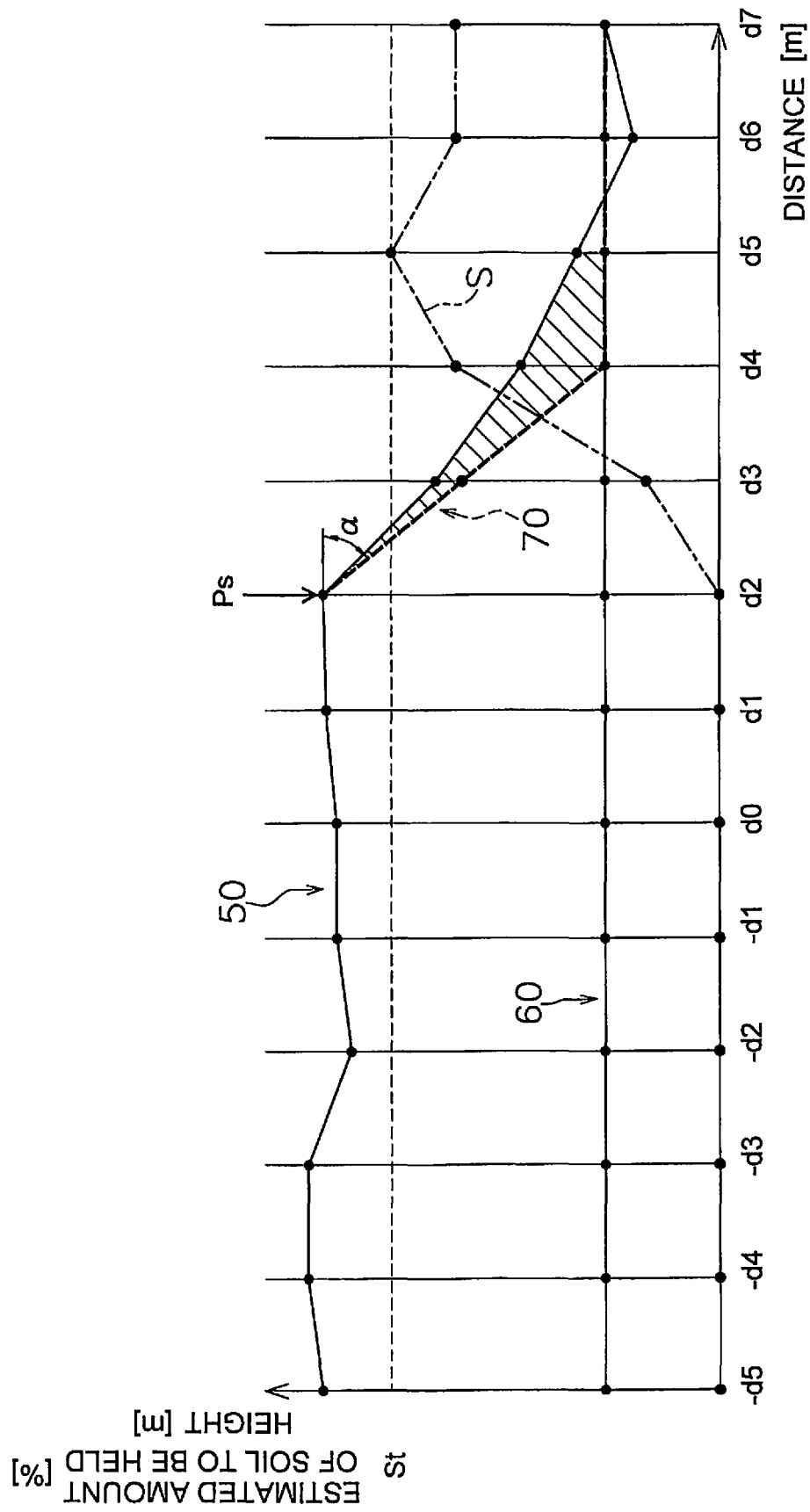
FIG. 8 is a diagram showing an example with a final design landscape, a current landscape, and a virtual design surface.

The controller 26 determines the virtual design surface 70 so that the virtual design surface 70 does not fall below the final design landscape 60. Thus, as shown in FIG. 8, the inclination angle α is determined so that the estimated amount of soil S to be held between the virtual design surface 70, the final design landscape 60, and the current landscape 50 matches the target amount of soil St. Hence, as shown in FIG. 8, when the excavation is started at the point d2, the controller 26 determines the virtual design surface 70 so that the virtual design surface 70 reaches the final design landscape 60 at a point d4 and extends along the final design landscape 60 at points following the point d4.

Figure 9A:
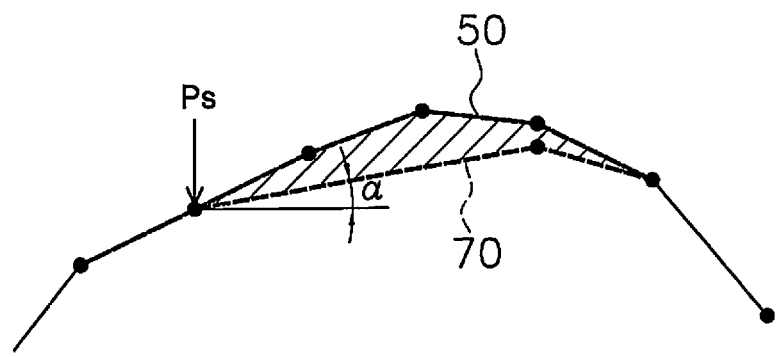
FIGS. 9A and 9B are diagrams showing an example of an inclination angle of a virtual design surface.
Figure 9B:
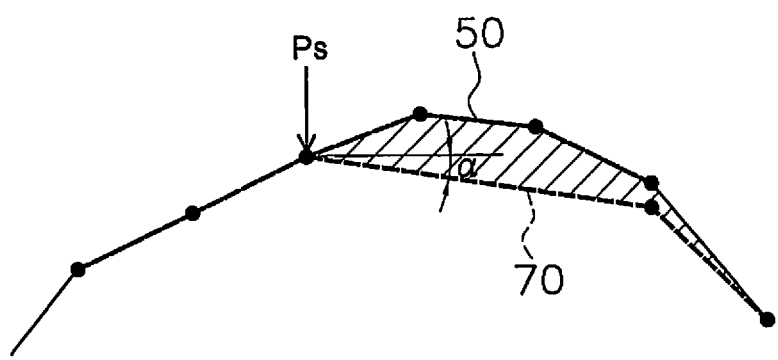

In step S203, it is determined whether or not the inclination angle α is an angle indicating a downward slope. In this case, when the inclination angle α calculated in step S202 indicates a downward slope in the traveling direction of the work vehicle with respect to the horizontal direction, the controller 26 determines that the inclination angle α is an angle indicating a downward slope. When the current landscape 50 includes an upward slope and a downward slope existing ahead of the upward slope, the inclination angle α may be an angle indicating an upward slope as shown in FIG. 9A in some cases, and in other cases may be an angle indicating a downward slope as shown in FIG. 9B.

When it is determined that the inclination angle α is an angle indicating a downward slope in step S203, the process proceeds to step S204. In step S204, whether a current surface behind the excavation start position Ps is an upward slope or not is determined. In this case, when the current surface (refer to, for example, the current surface 50_1 shown in FIG. 5), which is located immediately behind the excavation start position Ps in the traveling direction of the work vehicle 1, extends upwardly with respect to the horizontal direction and also forms an angle equal to or more than a predetermined angular threshold with respect to the horizontal direction, the controller 26 determines that the current surface behind the excavation start position Ps is an upward slope. To ignore a small undulation such as the current surface 50_1 shown in FIG. 5, the angular threshold may be a small value in a range from 1 degree to 6 degrees, for example. Alternatively, the angular threshold may be 0.

When it is determined that the current surface behind the excavation start position Ps is not an upward slope in step S204, the process proceeds to step S205. Thus, when the current surface behind the excavation start position Ps is a downward slope or a horizontal surface, the process proceeds to step S205. In step S205, a virtual design surface 70 inclined at the inclination angle α is determined as the virtual design surface 70 to be used to control the work implement 13. For example, as shown in FIG. 5, the controller 26 determines the virtual design surface 70 extending from the excavation start position Ps in a direction inclined at the inclination angle α.

Figure 10:
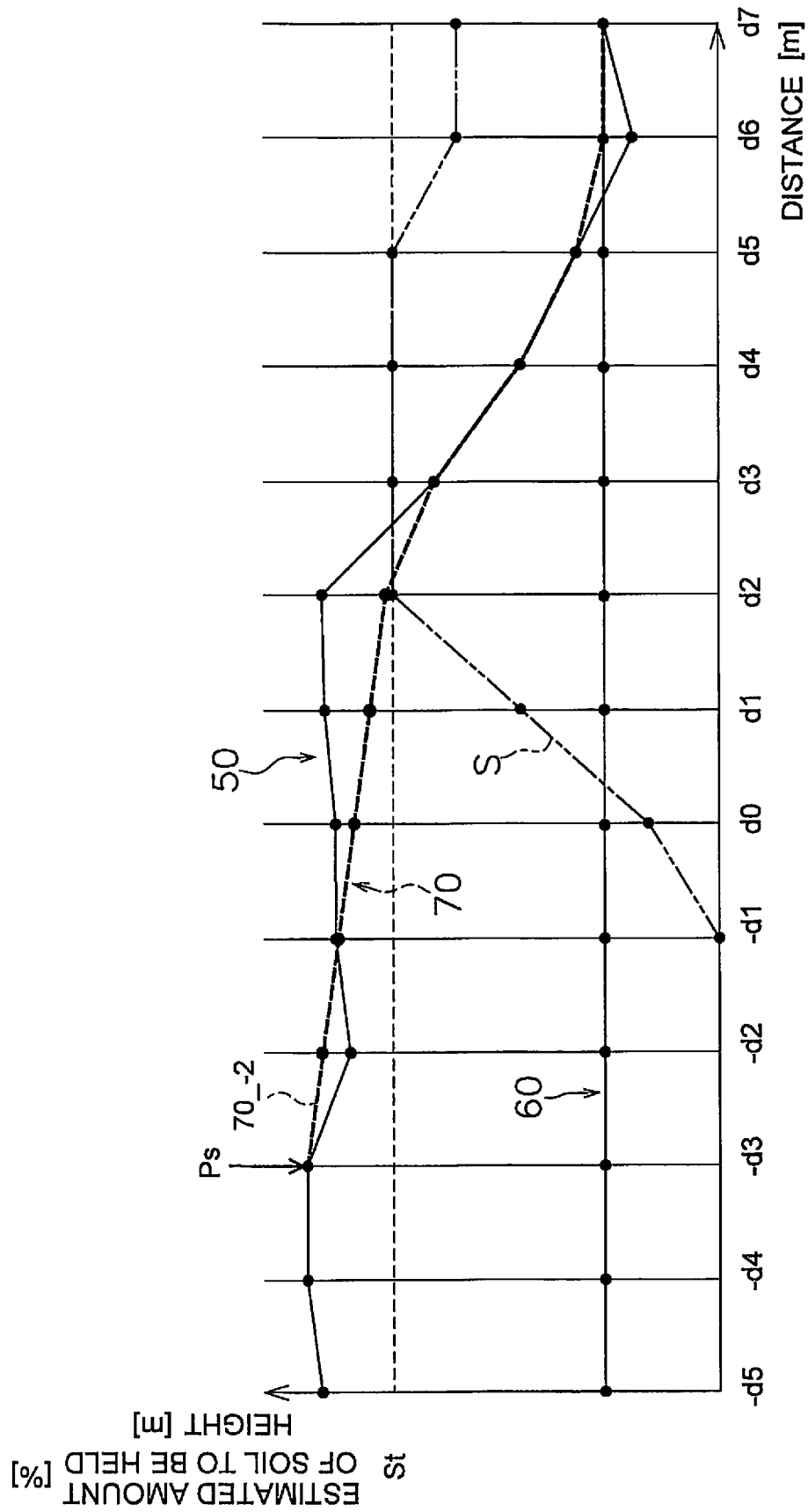
FIG. 10 is a diagram showing an example with a final design landscape, a current landscape, and a virtual design surface.

In step S206, whether or not an initial design surface (the initial design surface among multiple surfaces into which the virtual design surface 70 is divided) of the virtual design surface 70 is located above the current landscape 50 is determined. The initial design surface is a design surface located immediately ahead of the excavation start position Ps. For example, as shown in FIG. 10, when the design surface 70_2 immediately ahead of the excavation start position Ps is located above the current landscape 50, it is determined that the initial design surface 70_2 is located above the current landscape 50, and the process proceeds to step S207.

Figure 11:
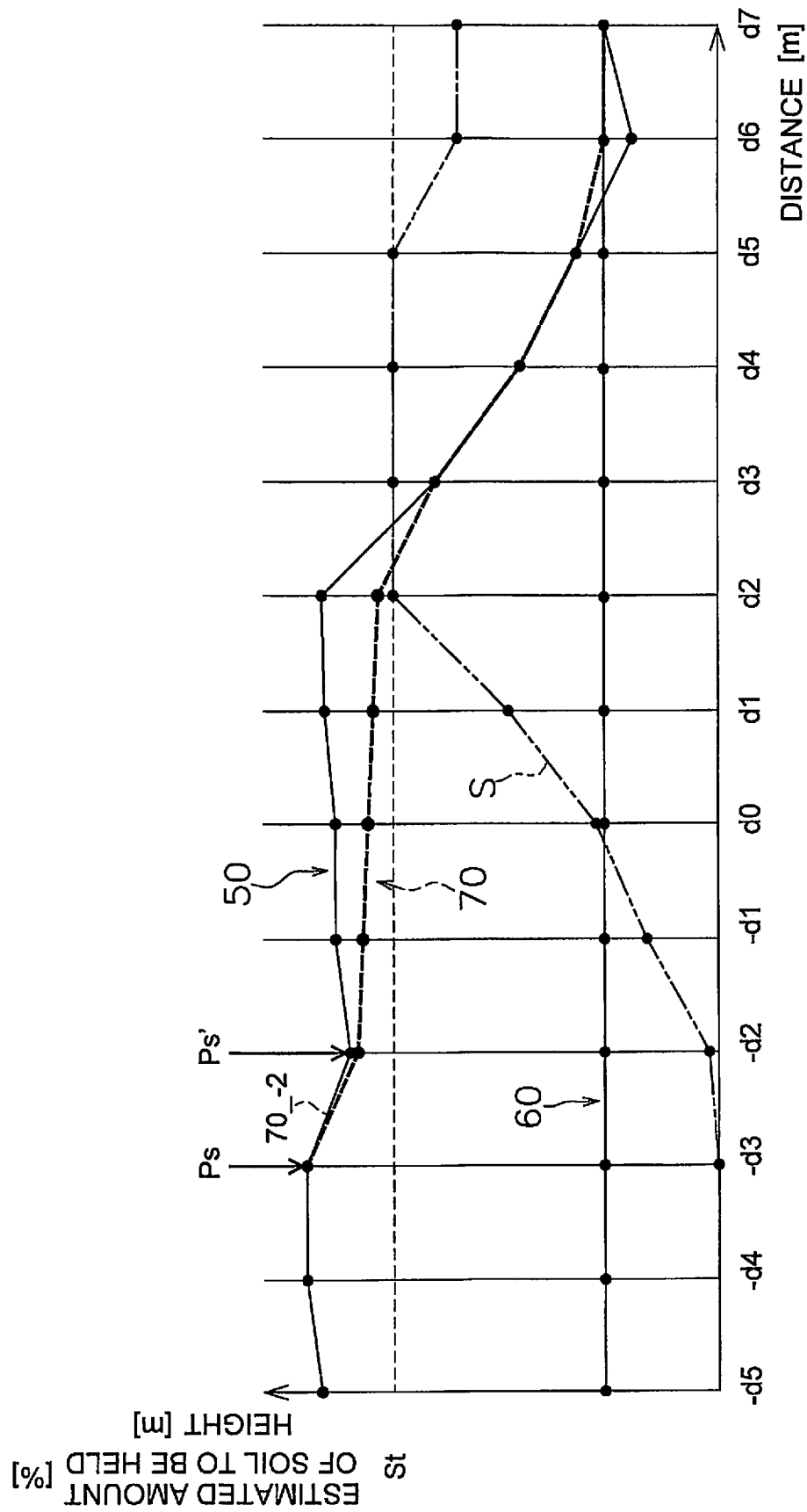
FIG. 11 is a diagram showing an example with a final design landscape, a current landscape, and a virtual design surface.

In step S207, the initial design surface is changed. In this case, the controller 26 changes the position of a design surface next to the excavation start position Ps to a position below the current landscape 50 by a predetermined distance. The predetermined distance may be a small value in a range from 0 cm to 10 cm, for example. As a result, the initial design surface 70_2 is changed to be located below the current landscape 50, as shown in FIG. 11. When the predetermined distance is 0 cm, the initial design surface 70_2 is changed to extend along the current landscape 50.

In addition, in step S208, the inclination angle α of the virtual design surface 70 is recalculated. In this case, the controller 26 recalculates the inclination angle α so that the estimated amount of soil S to be held, which is calculated for at a point (for example, a point −d2 shown in FIG. 11) next to the excavation start position Ps as a temporary excavation start position Ps', matches the target amount of soil St. Then, in the aforementioned step S107, the work implement 13 is controlled so that the work implement 13 moves along the virtual design surface 70 inclined at the recalculated inclination angle α.

Normally, the amount of soil held by the work implement 13 at the excavation start position Ps is 0 or an extremely small value. Thus, as shown in FIG. 10, even when the current landscape 50 includes a recess located immediately ahead of the excavation start position Ps, the recess cannot be filled with soil. Therefore, changing the initial design surface 70_2 in the aforementioned manner makes it possible to prevent the work implement 13 from swinging without touching soil.

On the other hand, when it is determined that the initial design surface of the virtual design surface 70 is not located above the current landscape 50 in step S206, the initial design surface is not changed. Thus, for example, as shown in FIG. 7, when the current landscape 50 includes a recess somewhere in the virtual design surface 70, the work implement 13 is controlled to pass over the recess. In this case, the work implement 13 holds soil that has been excavated before the work implement 13 reaches the recess from the excavation start position Ps. Thus, the work implement 13 can fill the recess with the soil by moving along the virtual design surface 70 that passes over the recess.

As shown in the aforementioned FIG. 9A, when the current landscape 50 includes an upward slope and a downward slope located ahead of the upward slope, the inclination angle α calculated in step S202 may be an angle indicating a horizontal surface or an upward slope. In this case, the process proceeds from step S203 to step S209.

Figure 12:
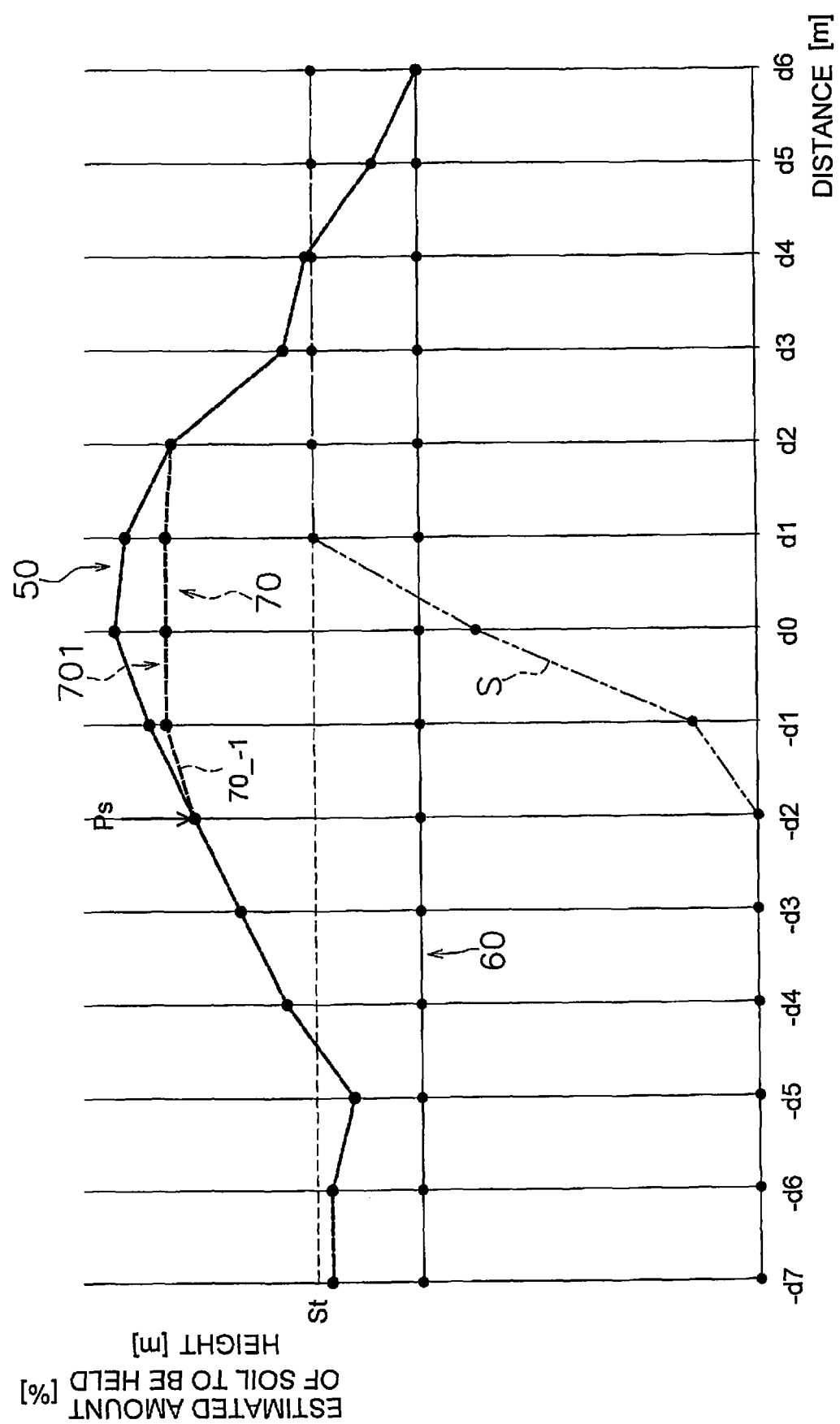
FIG. 12 is a diagram showing an example with a final design landscape, a current landscape, and a virtual design surface.

In step S209, the virtual design surface 70 including a scaffold surface 701 is determined. As shown in FIG. 12, the scaffold surface 701 is located below the current landscape 50 and extends in the horizontal direction. The controller 26 determines a virtual design surface 70 including the scaffold surface 701 extending in the horizontal direction from a point next to the excavation start position Ps (refer to a point −d1 shown in FIG. 12) and an initial design surface (refer to a design surface 70_1 shown in FIG. 12) connecting the excavation start position Ps to the scaffold surface 701.

Note that the scaffold surface 701 may not be completely parallel to the horizontal direction. The scaffold surface 701 may extend in a direction forming a small angle with the horizontal direction. For example, the scaffold surface 701 may be inclined at a smaller angle than an inclination angle of an upward slope at the excavation start position Ps.

In step S210, the controller 26 determines the height of the scaffold surface 701 so that an estimated amount of soil S to be held between the virtual design surface 70 and the current landscape 50 matches the target amount of soil St. The controller 26 determines the virtual design surface 70 so that the virtual design surface 70 extends along the current landscape 50 at points following the point (point d1 shown in FIG. 12) at which the amount of soil between the virtual design surface 70 and the current landscape 50 reaches the target amount of soil St.

In this way, when the inclination angle α is an angle indicating an upward slope, the controller 26 controls the work implement 13 so that the work implement 13 moves along the virtual design surface 70 including the scaffold surface 701. As a result, a flat landscape serving as a scaffold for the work vehicle 1 is formed, and thereby the work operation can be efficiently performed thereafter.

Figure 13:
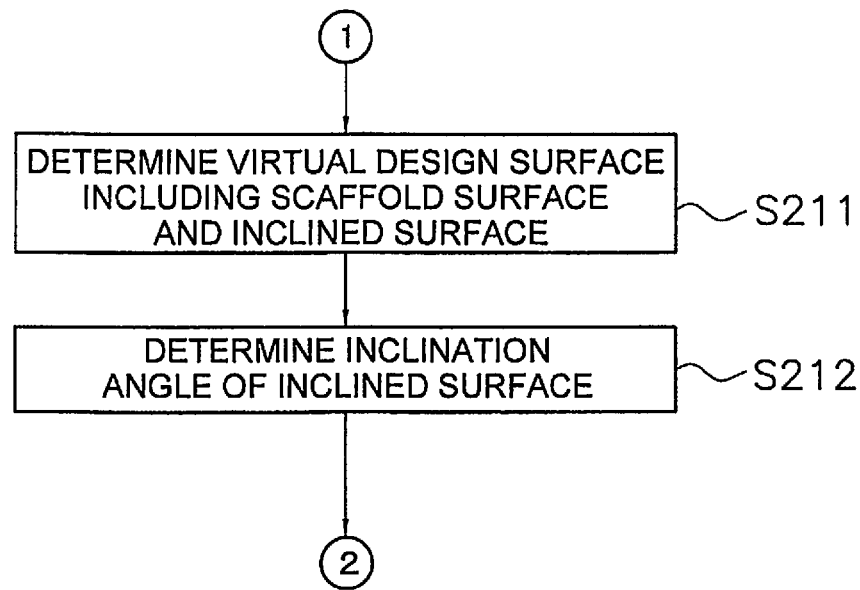
FIG. 13 is a flowchart showing a process of automatic control of the work implement.

When the inclination angle α is an angle indicating a downward slope in step S203, the process proceeds to step S204. As shown in FIG. 9B, when the current surface located behind the excavation start position Ps is an upward slope, the process proceeds to step S211 shown in FIG. 13.

Figure 14:
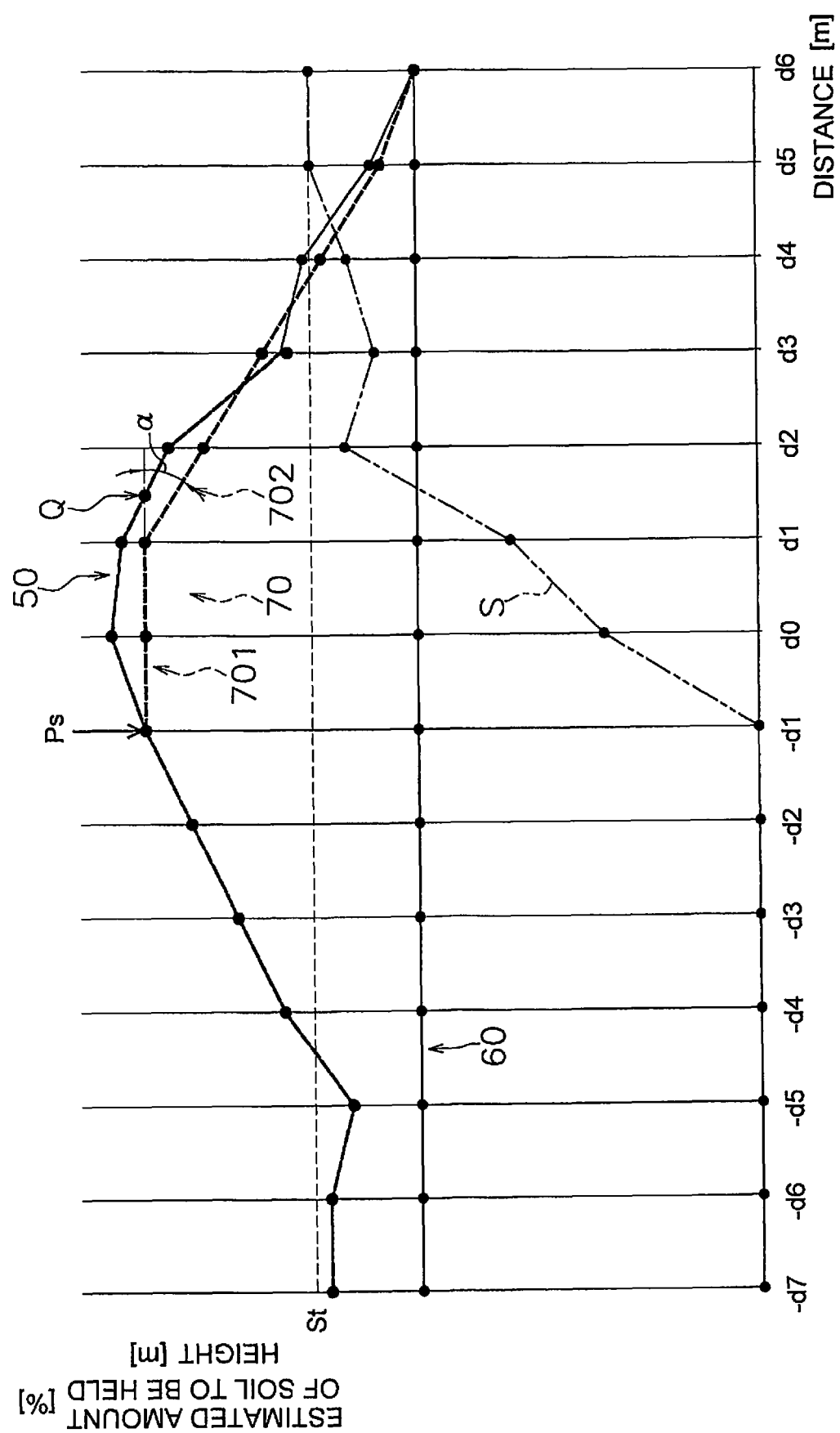
FIG. 14 is a diagram showing an example with a final design landscape, a current landscape, and a virtual design surface.

In step S211, a virtual design surface 70 including the scaffold surface 701 and a surface 702 inclined with respect to the scaffold surface 701 is determined. As shown in FIG. 14, the scaffold surface 701 is located below the current landscape 50 and extends from the excavation start position Ps in the horizontal direction. Note that the scaffold surface 701 may not be completely parallel to the horizontal direction. The scaffold surface 701 may extend in a direction forming a small angle with respect to the horizontal direction. For example, the scaffold surface 701 may be inclined at a smaller angle than an inclination angle of the upward slope behind or ahead of the excavation start position Ps.

The scaffold surface 701 extends to a point located immediately behind a current restoration point Q. The current restoration point Q is a point at which the extension of the scaffold surface 701 overlaps the current landscape 50. The inclined surface 702 extends from a point located immediately behind the current restoration point Q. In FIG. 14, the inclined surface 702 extends from a point d1 located immediately behind the current restoration point Q.

In step S212, an inclination angle α of the inclined surface 702 is calculated. In this case, the controller 26 calculates the inclination angle α of the inclined surface 702 so that the amount of soil between the current landscape 50 and the virtual design surface 70 including the scaffold 701 and the inclined surface 702 matches the target amount of soil St.

As described above, when the excavation start position Ps is located on the upward slope, and the inclination angle α calculated in step S202 is an angle indicating a downward slope, the controller 26 determines the virtual design surface 70 including the scaffold surface 701 extending from the excavation start position Ps and the inclined surface 702 with respect to the scaffold surface 701. Then, the controller 26 controls the work implement 13 so that the work implement 13 moves along the virtual design surface 70 including the scaffold surface 701 and the inclined surface 702. As a result, a flat landscape serving as a scaffold for the work vehicle 1 is formed, and thereby the work operation can be efficiently performed thereafter.

In addition, in this case, when only the scaffold surface 701 is formed, the work implement 13 has an available space to hold soil. Thus, by moving the work implement 13 along the inclined surface 702, the excavation can be performed along the inclined surface 702 on the side of the downward slope without wasting the space available to hold soil. This therefore makes it possible to improve the efficiency of the work operation.

Figure 15:
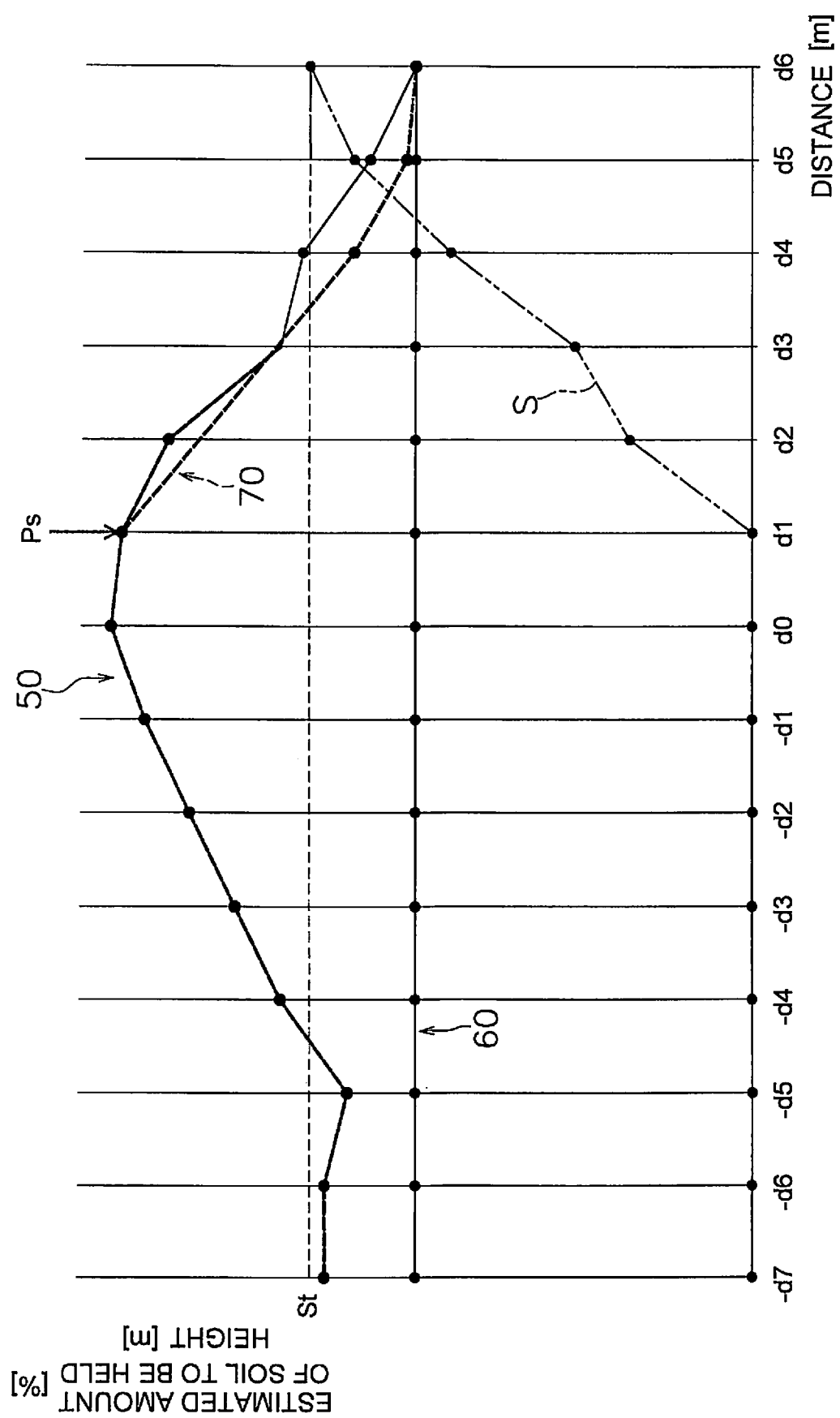
FIG. 15 is a diagram showing an example with a final design landscape, a current landscape, and a virtual design surface.

Note that even when the current landscape 50 includes an upward slope and a downward slope, the excavation start position Ps is located on a downward slope as shown in FIG. 15, and the inclination angle α calculated in step S202 is an angle indicating the downward slope, the controller 26 controls the work implement 13 so that the work implement 13 moves along the virtual design surface 70 inclined at the inclination angle α.

Although the embodiment of the invention has been described above, the invention is not limited to the aforementioned embodiment and may be variously changed without departing from the gist of the invention.

The work vehicle is not limited to the bulldozer and may be another vehicle such as a wheel loader.

The work vehicle 1 may be a remotely controllable vehicle. In this case, a portion of the control system 3 may be disposed outside the work vehicle 1. For example, the controller 26 may be disposed outside the work vehicle 1. The controller 26 may be disposed in a control center separated from the work site.

Figure 16:
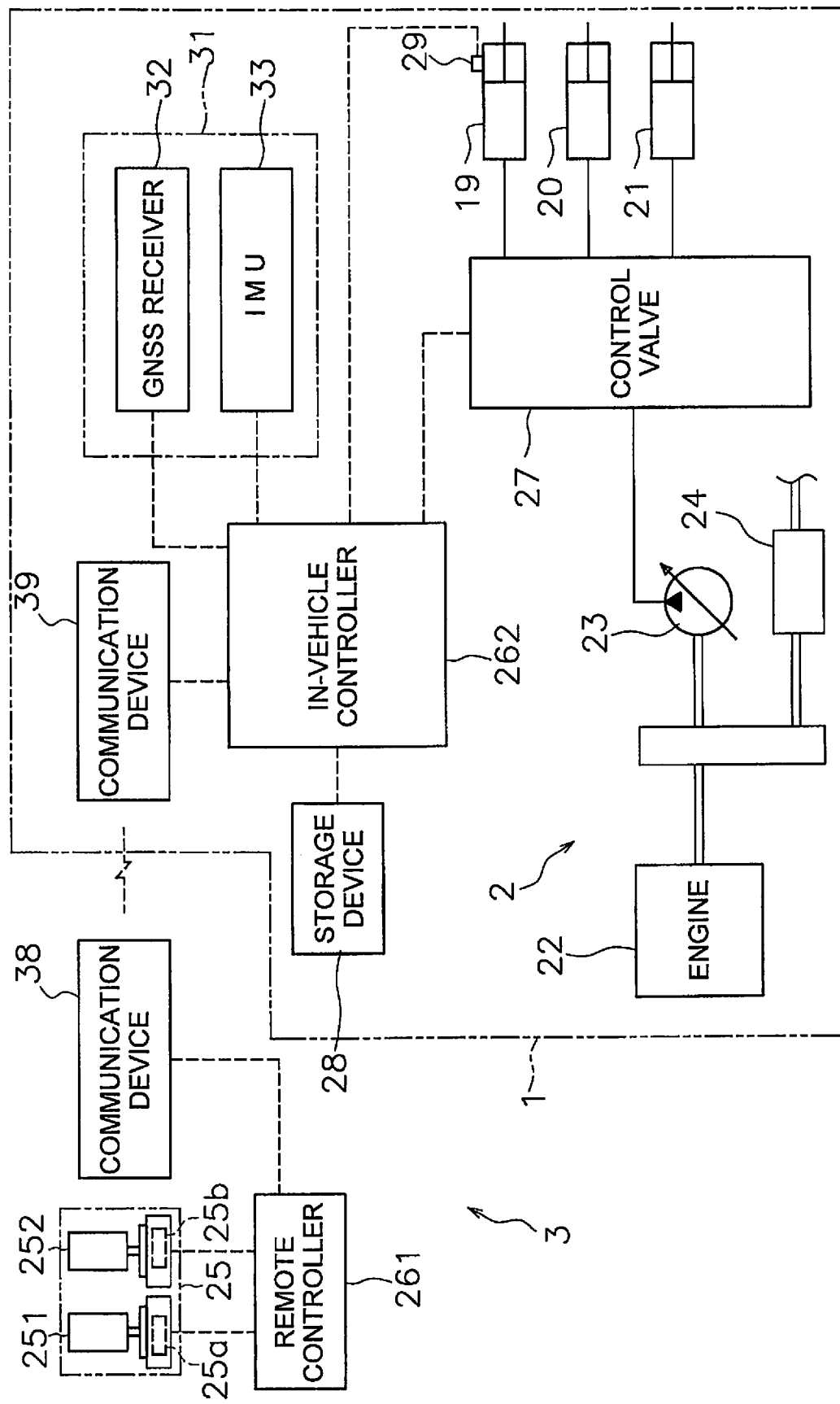
FIG. 16 is a block diagram showing a configuration of a control system according to a modified example.

The controller may be separated in multiple controllers. For example, as shown in FIG. 16, the controller may include a remote controller 261 disposed outside the work vehicle 1 and an in-vehicle controller 262 disposed in the work vehicle 1. The remote controller 261 and the in-vehicle controller 262 may wirelessly communicate with each other via communication devices 38 and 39. Then, one or more of the aforementioned functions of the controller 26 may be performed by the remote controller 261, while the other functions may be performed by the in-vehicle controller 262. For example, the process of determining the virtual design surface 70 may be performed by the remote controller 261, while the process of outputting the command signal to the work implement 13 may be performed by the in-vehicle controller 262.

The operating device 25 may be disposed outside the work vehicle 1. In this case, the operator cab may be omitted from the work vehicle 1. Alternatively, the operating device 25 may be omitted from the work vehicle 1. The work vehicle 1 may be operated by only the automatic control via the controller 26 without an operation via the operating device 25.

Figure 17:
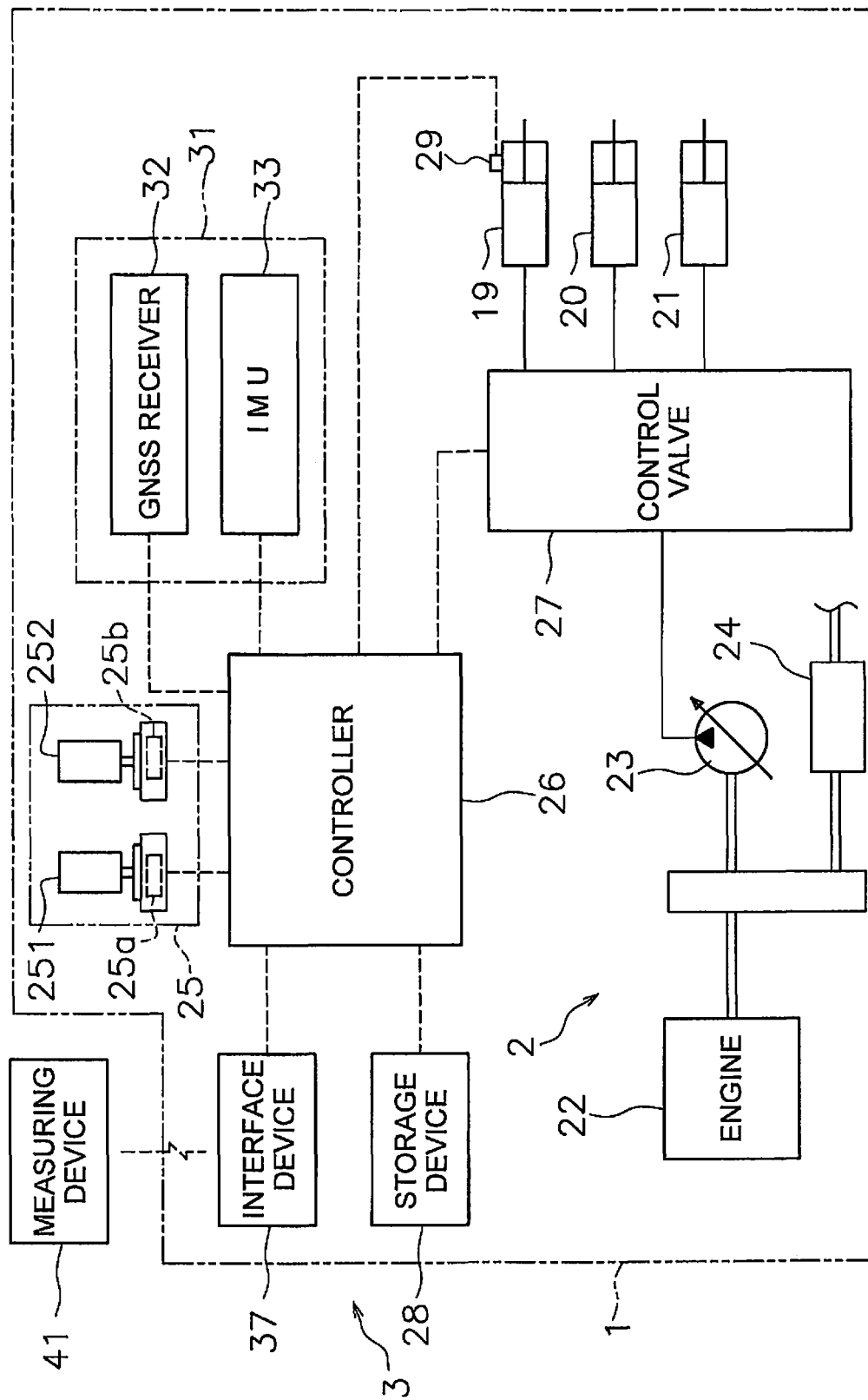
FIG. 17 is a block diagram showing a configuration of a control system according to another modified example.
Figure 18:
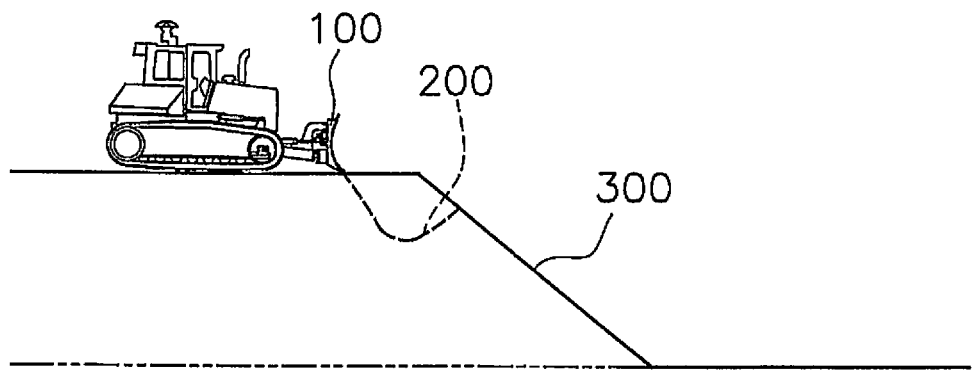
FIG. 18 is a diagram showing excavation according to a conventional technique.

The current landscape acquiring device is not limited to the aforementioned position detecting device 31 and may be another device. For example, as shown in FIG. 17, the current landscape acquiring device may be the interface device 37 that receives information from an external device. The interface device 37 may wirelessly receive current landscape information measured by an external measuring device 41. Alternatively, the interface device 37 may be a device for reading a storage medium and may receive the current landscape information measured by the external measuring device 41 via the storage medium.

According to the invention, a system for controlling a work vehicle, a method for controlling a work vehicle, and a work vehicle can be provided which enable an efficient excavation operation with a high-quality finish.

The invention claimed is:

1. A system for controlling a work vehicle including a work implement, the system comprising:
a storage device that stores current landscape information indicating a current landscape to be subjected to a work operation;
a sensor that outputs a signal indicating an excavation start position at which the work implement starts excavation; and
a controller that communicates with the storage device and receives the signal from the sensor, the controller being configured to
determine an inclination angle of a virtual design surface so that an amount of soil between the virtual design surface extending from the excavation start position and the current landscape matches a predetermined target amount of soil, and
generate a command signal that causes the work implement to move along the virtual design surface extending from the excavation start position in a direction inclined at the inclination angle.

2. The system for controlling a work vehicle according to claim 1, wherein
the virtual design surface linearly extends from the excavation start position to a point at which the amount of soil between the virtual design surface and the current landscape matches the predetermined target amount of soil.

3. The system for controlling a work vehicle according to claim 2, wherein
the controller is further configured to determine the virtual design surface so that the virtual design surface extends along the current landscape at points following the point at which the amount of soil between the virtual design surface and the current landscape matches the target amount of soil.

4. The system for controlling a work vehicle according to claim 1, wherein
the storage device stores design landscape information indicating a final design landscape to be subjected to the work operation, and
the controller is further configured to determine the virtual design surface so that the virtual design surface does not fall below the final design landscape.

5. The system for controlling a work vehicle according to claim 1, wherein
the controller includes
a first controller disposed outside the work vehicle, and
a second controller that is disposed inside of the work vehicle and communicates with the first controller,
the first controller being configured to communicate with the storage device and receive the signal from the sensor, and
the second controller being configured to generate the command signal that causes the work implement to move.

6. A computer-implemented method for controlling a working vehicle including a work implement, the method comprising:
acquiring current landscape information indicating a current landscape to be subjected to a work operation;
acquiring an excavation start position at which the work implement starts excavation;
determining an inclination angle of a virtual design surface so that an amount of soil between the virtual design surface extending from the excavation start position and the current landscape matches a predetermined target amount of soil; and
generating a command signal that causes the work implement to move along the virtual design surface extending from the excavation start position in a direction inclined at the inclination angle.

7. The method for controlling a working vehicle according to claim 6, wherein
the virtual design surface linearly extends from the excavation start position to a point at which the amount of soil between the virtual design surface and the current landscape matches the predetermined target amount of soil.

8. The method for controlling a working vehicle according to claim 7, wherein
the virtual design surface is determined so that the virtual design surface extends along the current landscape at points following the point at which the amount of the soil between the virtual design surface and the current landscape matches the predetermined target amount of soil.

9. The method for controlling a working vehicle according to claim 7, further comprising
acquiring design landscape information indicating a final design landscape to be subjected to the work operation, and
the virtual design surface being determined so that the virtual design surface does not fall below the final design landscape.

10. A work vehicle comprising:
a work implement;
a sensor that outputs a signal indicating an excavation start position at which the work implement starts excavation; and
a controller that receives the signal from the sensor, the controller being configured to
determine an inclination angle of a virtual design surface so that an amount of soil between the virtual design surface extending from the excavation start position and the current landscape to be subjected to a work operation matches a predetermined target amount of soil, and
generate a command signal that causes the work implement to move along the virtual design surface extending from the excavation start position in a direction inclined at the inclination angle.

11. The work vehicle according to claim 10, wherein
the virtual design surface linearly extends from the excavation start position to a point at which the amount of soil between the virtual design surface and the current landscape matches the predetermined target amount of soil.

12. The work vehicle according to claim 11, wherein
the controller is further configured to determine the virtual design surface so that the virtual design surface extends along the current landscape at points following the point at which the amount of the soil between the virtual design surface and the current landscape matches the predetermined target amount of soil.

13. The work vehicle according to claim 10, wherein the controller is further configured to
   acquire design landscape information indicating a final design landscape to be subjected to the work operation, and
   determine the virtual design surface so that the virtual design surface does not fall below the final design landscape.

\* \* \* \* \*